US009720623B2

(12) United States Patent
Benton et al.

(10) Patent No.: US 9,720,623 B2
(45) Date of Patent: Aug. 1, 2017

(54) MANAGEMENT OF DATA IN MULTI-STORAGE SYSTEMS THAT CAN INCLUDE NON-VOLATILE AND VOLATILE STORAGES

(71) Applicant: TERADATA US, INC., Dayton, OH (US)

(72) Inventors: Philip J. Benton, San Diego, CA (US); Steven B. Cohen, Redondo Beach, CA (US); Eric M. Shank, San Diego, CA (US); Albert O. Lam, San Diego, CA (US); Gary Lee Boggs, San Diego, CA (US); Donald Pederson, San Diego, CA (US); Wayne R. Boyle, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 14/573,850

(22) Filed: Dec. 17, 2014

(65) Prior Publication Data
US 2015/0186046 A1    Jul. 2, 2015

Related U.S. Application Data

(60) Provisional application No. 61/922,006, filed on Dec. 30, 2013, provisional application No. 61/921,994, (Continued)

(51) Int. Cl.
*G06F 12/02* (2006.01)
*G06F 12/08* (2016.01)
(Continued)

(52) U.S. Cl.
CPC ............ *G06F 3/0655* (2013.01); *G06F 3/065* (2013.01); *G06F 12/0866* (2013.01);
(Continued)

(58) Field of Classification Search
CPC .. G06F 12/0866; G06F 12/121; G06F 12/122; G06F 2212/69
See application file for complete search history.

(56) References Cited

U.S. PATENT DOCUMENTS

2009/0049234 A1* 2/2009 Oh ...................... G06F 12/0246
711/103
2015/0121024 A1* 4/2015 Kolvick ................ G06F 3/0647
711/162

* cited by examiner

*Primary Examiner* — Aracelis Ruiz
(74) *Attorney, Agent, or Firm* — Ramin Mahboubian

(57) ABSTRACT

Techniques for management of data in multi-storage systems allow managing storage of data in one of the multiple storages (e.g., a HDD) based on the information associated with the storage and/or access of data (e.g., logical hits of data in a cache memory) in another one of the storages (e.g., a cache memory) of the multi-storage system. In one aspect, information associated with storage and/or access of data in a volatile (or non-persistent) storage environment is provided for managing the storage of data in a non-volatile (or persistent) storage environment. By way of example, data access information associated with a volatile storage environment (e.g., logical hits of data in a cache) can be effectively communicated to a non-volatile storage environment, for example, as information that can be indicative of data temperatures. Moreover, the information obtained from a non-volatile storage environment can be persistently stored for and/or in the non-volatile environment (e.g., stored as persistent data temperatures), thereby preserving and allowing the information to be used to more effectively manage the storage of the data in the non-volatile storage itself and/or the multi-storage system including the (volatile storage) as a whole.

19 Claims, 10 Drawing Sheets

Related U.S. Application Data filed on Dec. 30, 2013, provisional application No. 61/922,022, filed on Dec. 30, 2013.

(51) Int. Cl.
*G06F 12/12* (2016.01)
*G06F 3/06* (2006.01)
*G06F 12/122* (2016.01)
*G06F 12/0866* (2016.01)
*G06F 12/121* (2016.01)

(52) U.S. Cl.
CPC .......... *G06F 12/121* (2013.01); *G06F 12/122* (2013.01); *G06F 2212/69* (2013.01)

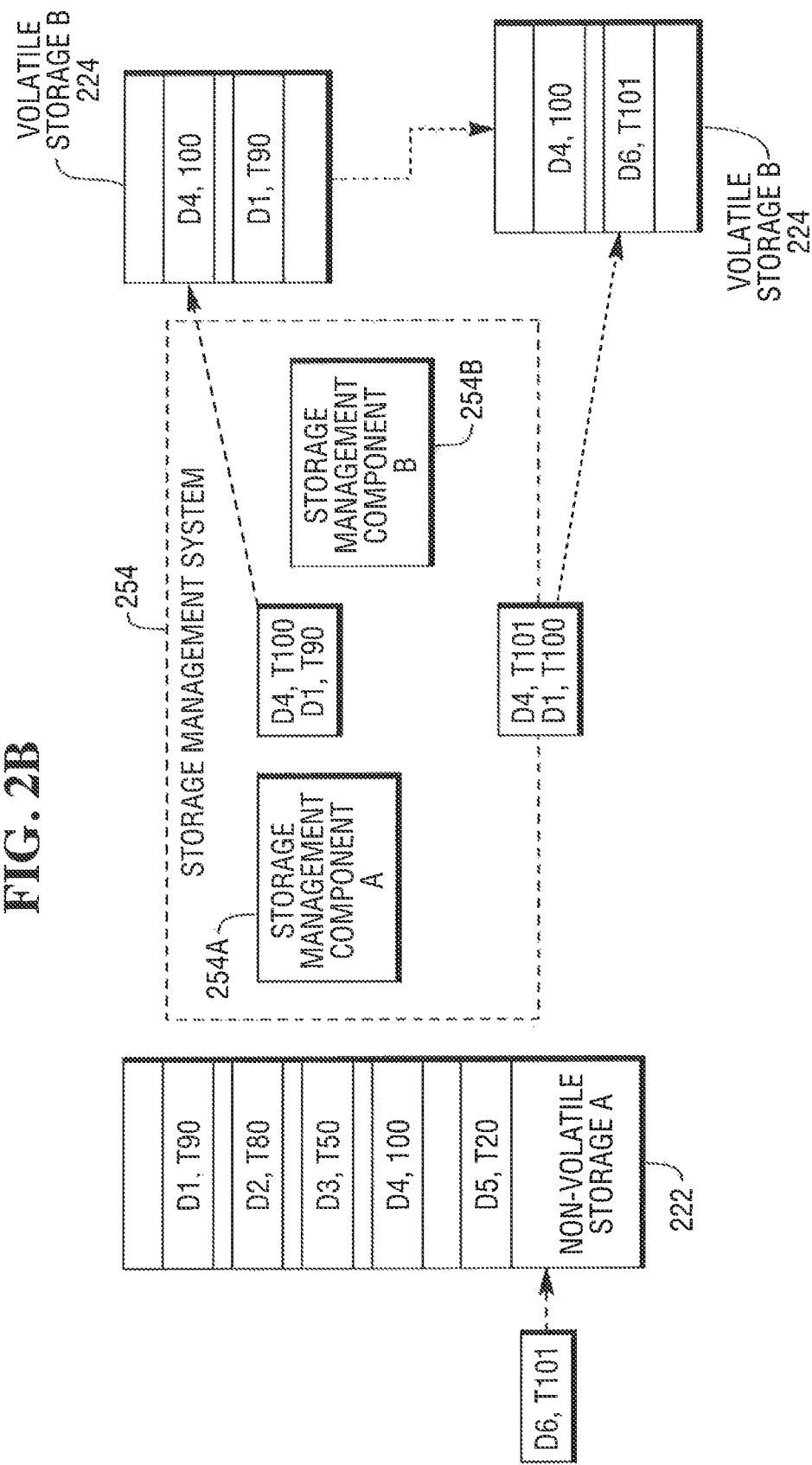

MANAGEMENT OF DATA IN MULTI-STORAGE SYSTEMS THAT CAN INCLUDE NON-VOLATILE AND VOLATILE STORAGES

CROSS-REFERENCES TO RELATED APPLICATIONS

This application also takes priority of the Provisional U.S. Patent Application No. 61/921,994, entitled: "management of data in multi-storage systems that can include non-volatile and volatile storages," filed on Dec. 30, 2013, which is hereby incorporated by reference herein in its entirety and for all purposes."

This application takes priority of the Provisional U.S. Patent Application No. 61/922,006, entitled: "management of data in multi-storage systems that can include non-volatile and volatile storages," filed on Dec. 30, 2013, which is hereby incorporated by reference herein in its entirety and for all purposes."

This application takes priority of the Provisional U.S. Patent Application No. 61/922,022, entitled: "management of data in multi-storage systems that can include non-volatile and volatile storages," filed on Dec. 30, 2013, which is hereby incorporated by reference herein in its entirety and for all purposes.

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

Generally, one important aspect of computing and computing systems is storage of data. Today, there is an ever increasing need to manage storage of data in computing environments. Databases are good examples of computing environments or systems where the storage of data can be crucial. As such, databases are discussed below in greater detail as an example.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex.

Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations, larger user communities, or device populations. Larger databases can be supported by relatively larger capacities, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

Generally, data (or "Statistics") can be collected and maintained for a database. "Statistics" can be useful for various purposes and for various operational aspects of a database. In particular, "Statistics" regarding a database can be very useful in optimization of the queries of the database, as generally known in the art.

More recently, in-memory processing systems, including in-memory database systems have been developed where data is typically stored and processed in memory which can offer much faster processing times than systems that also store data for processing in non-volatile or persistent storages (e.g., Hard Disk Drives (HDD's, Solid Disk Drives (SDD), Flash memory).

In view of the foregoing, storage of data is an important aspect of computing systems, especially for database systems as have become prevalent in various aspects of life and commerce today.

SUMMARY

Broadly speaking, the invention relates to computing environments and systems. More particularly, techniques for management of data in multi-storage systems are disclosed.

In accordance with one aspect, storage of data in a first storage of multiple storages in a multi-storage system can be managed based on the temperature of the data (or data temperature) obtained for a second storage of the multiple storages in a multi-storage system. For example, in a multi-storage system that includes at least one non-volatile storage (e.g., one or more HDDs) and at least one volatile storage (e.g., a cache memory device), the storage of a particular data portion (e.g., a storage unit of data) for the at least one volatile storage can be managed based on a temperature of the data determined for the non-volatile storage. By way of example, persistent temperatures used for management of data in a non-volatile storage system (e.g., a multi-tier storage of a database system) can be used to effectively manage the storage of the data in a cache memory that is typically provided for improving performance by keeping data that is likely to be used in the cache memory. As a result, overall performance of a system can be further enhanced by allowing persistent temperature measurements to be used in managing cache memory, instead of solely relying on conventional techniques for caching data which typically do not take into account persistent temperatures associated with a non-volatile storage environment.

Generally, information associated with temperatures of various data (or data temperature) in a non-volatile storage environment can be effectively communicated to a volatile storage environment to effectively manage storage of the data in the volatile storage environment by taking into account data temperatures that otherwise may have been ignored in managing the volatile storage environment. In addition, data temperatures can be provided to a volatile storage environment in a dynamic manner, for example, periodically, when a significant change occurs, a determined number of operations have occurred) allowing the volatile storage environment to effectively adapt to changes so that it can continue to manage storage of data properly and in efficient manner by, for example, keeping very "Hot" data in its storage, removing data from it storage as it becomes relatively "colder," while disregarding "cold" data all together.

In accordance with another aspect, a combination of non-persistent-based and persistent-based schemes are used to effectively manage volatile storages which are conventionally managed solely by using non-persistent schemes (e.g., LRU schemes in cache memory). Generally, the persistent-based schemes can be based on persistent information associated with a non-volatile storage environment (e.g., persistent data temperatures associated with data stored in non-volatile storages). In this context, a persistent-based scheme can, for example, be effectively used in addition or combination with a conventional scheme provided for volatile memory. By way of example, a LRU scheme can be combined with a scheme based on persistent data temperatures in order to more effectively manage cache memory provided to enhance the performance of a system.

In one embodiment, a first part of cache memory is used to effectively implement a conventional caching technique, while a second part of the cache memory is used to effectively implement a caching technique based on persistent temperatures. The persistent temperatures can, for example, be communicated from a non-volatile storage environment. In the example, at a given time, only one copy of the data needs to be maintained either in the first or the second part of the cache. Also, data can be maintained in manner recognizable by both caching schemes, for example, by using a unique identifier (e.g., an assigned unique identifier to a unit of storage allocation) in the cache regardless of which part of the cache currently maintains the data. In this way, conventional non-persistent and persistent caching techniques can be used together to provide a more comprehensive and/or accurate view of data for better storage management of data in or out of the cache memory, thereby further enhancing performance.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2B depicts communication of persistent data temperatures to a volatile memory provided, for example, as cache memory in accordance with one embodiment.

DETAILED DESCRIPTION

Figure 1A:
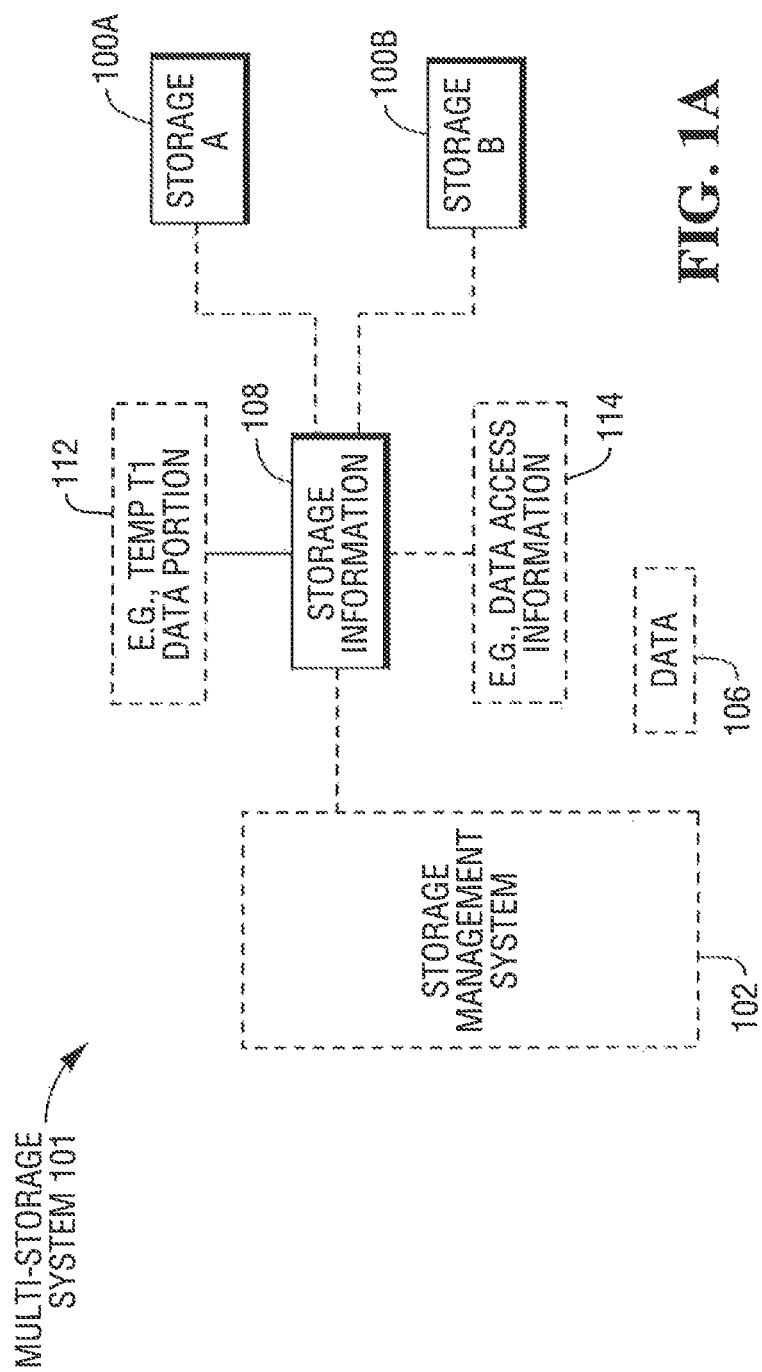
FIG. 1A depicts a multi-storage system with a storage management system in accordance with one or more embodiments of the invention.

As noted in the background section, as an important aspect of computing systems, storage of data is very useful, especially for database systems that have become prevalent in various aspects of commerce and personal life.

Although storing data in volatile memory can improve processing efficiency because it is can typically provide better access times than non-volatile memory. It is not always possible or feasible to store all data in volatile memory, especially in view of the fact there appears to be a need to store more and more data, and in forms such as video, social media, etc. that require much more storage. In fact, typically, all data does not have the same value and data is not always used in the same way. Rather than blindly storing all data in memory in a brute force approach, there is a need to use storage devices more effectively or more intelligently.

In other words, there is a need for alternative techniques for storage of data in computing environments. Accordingly, techniques for storage of data in multi-storage systems are disclosed. It will be appreciated that, among other things, the techniques can offer an alternative solution to blindly storing all data in memory in a brute force approach. Instead, multi-storage system can be used even more effectively ("more intelligently").

In accordance with one aspect of the invention, storage of data in a first storage of multiple storages in a multi-storage system can be managed based on the temperature of the data (or data temperature) obtained for a second storage of the multiple storages in a multi-storage system. For example, in a multi-storage system that includes at least one non-volatile storage (e.g., one or more HDDs) and at least one volatile storage (e.g., a cache memory device), the storage of a particular data portion (e.g., a storage unit of data) for the at least one volatile storage can be managed based on a temperature of the data determined for the non-volatile storage. By way of example, persistent temperatures used for management of data in a non-volatile storage system (e.g., a multi-tier storage of a database system) can be used to effectively manage the storage of the data in a cache memory that is typically provided for improving performance by keeping data that is likely to be used in the cache memory. As a result, overall performance of a system can be further enhanced by allowing persistent temperature measurements to be used in managing cache memory, instead of solely relying on conventional techniques for caching data which typically do not take into account persistent temperatures associated with a non-volatile storage environment.

Generally, information associated with temperatures of various data (or data temperature) in a non-volatile storage environment can be effectively communicated to a volatile storage environment to effectively manage storage of the data in the volatile storage environment by taking into account data temperatures that otherwise may have been ignored in managing the volatile storage environment. In addition, data temperatures can be provided to a volatile storage environment in a dynamic manner, for example, periodically, when a significant change occurs, or a determined number of operations have occurred, thereby allowing the volatile storage environment to effectively adapt to changes so that it can continue to manage storage of data properly and in an efficient manner by, for example, keeping very "Hot" data in its storage, removing data from it storage as it becomes relatively "colder," while disregarding "cold" data all together.

Embodiments of these aspects of the invention are also discussed below with reference to FIGS. 1A-8. However, those skilled in the art will readily appreciate that the detailed description given herein with respect to these figures is for explanatory purposes as the invention extends beyond these limited embodiments.

FIG. 1A depicts a multi-storage system 101 with a storage management system 102 system in accordance with one or more embodiments of the invention. It should be noted that the multi-storage system 101 can, for example, be provided as a computing system and/or device. As such, the multi-storage system 101 can, for example, include one or more processors and memory (not shown). The multi-storage system 101 can also include at least one non-transitory computer readable medium (not shown) that stores executable computer code that when executed can perform at least a part of the functionality of the storage management 102, as will readily be appreciated by those skilled in the art. Generally, the storage management system 102 can be provided using executable computer code (software) and/or using one or more hardware components (hardware).

As a multi-storage system, multi-storage system 101 (shown in FIG. 1A) can include two or more storages (e.g., storages 100A and 100B). In other words, as a storage system that can include and/or support multiple storages, the multi-storage system 101 can be provided with at least two storages, namely, storage A (100A) and storage B (100B) as depicted in FIG. 1. For example, each one of the storages A and B can include and/or can be, one or more storage environments, one or more storage devices, one or more pools of storage resources, one or more groups of storage devices, and so on. As a simple example, each one of the storages A and B (100A and 100B) can be a storage device (e.g., a HDD, SDD, cache memory).

In the multi-storage system 101, the storage management system 102 system can effectively manage the storage of data 106 in one or more of the storages 100A and 100B even though the storages may be widely different with respect to one or more criteria, including, for example, different characteristics with respect to volatility and/or persistence, assigned tier-levels, etc. For example, the storage management system 102 system can effectively manage the storage of data 106 in accordance with one or more embodiments that will be described in greater detail below More specifically, referring to FIG. 1A, the storage management system 102 can effectively manage the storage of data 106 for (e.g., at, in) one of the multiple storages (e.g., storage 100A) of the multi-storage system 101, based on the information 108 associated with another one of the multiple storages (e.g., storage 100B) in accordance with one embodiment. The information 108 associated with a storage (or "storage information") can, for example, include, persistent data temperatures 112 (e.g., persistent temperatures associated with a persistent or non-volatile storage), data access information 114 (e.g., data access information associated with a non-persistent or volatile storage, logical hits in a non-volatile memory, cache hits in cache memory).

In addition to managing the storage of data 106 for one of the multiple storages 100A and 100B, based on the storage information 108 that can be associated with another one of the storages of the multi-storage system 100, the storage management system 102 can effectively combine and/or consolidate the storage information associated with each one the storages 100A and 100B to allow for better management of storage of data in the multi-storage system 101. This also means that storage management system 102 can better manage the multi-storage system 101 as a whole, for example, by effectively communicating storage related information 108 between the two storage environments of storages 100A and 100B and/or by facilitating coordination of storage related activities between the storages 100A and 100B even though the storages 100A and 100B can widely differ from each other with respect to one or more criteria including, for example, whether they are volatile or persistent storages. These features are described in even greater details below.

For example, in accordance with one embodiment, the storage management system 102 can effectively manage the storage of a data portion in one of the multiple storages (e.g., storage 100B) of the multi-storage system 101, based on its temperature value T1 (112) provided as storage information 108 and obtained for another of the multiple storages (e.g., storage 100A) as will be described in greater detail below. In this context, a data temperature (or "temperature") value can, for example, be a value indicative of one or more storage management policies with respect to storage of the data in the two or more storages based on the one or more differing characteristics. As a simple example, a temperature value can be indicative or whether data it considered to have an attribute or characteristic or not (e.g., "1" as a value indicative of "hot" data, whereas "0" is indicative or data that is not "hot," or "cold" data). As another simple example, integer values, possibly in a range, can be assigned to effectively indicate the "hotness" of the data in the range, where data "hotness" can, for example, reflect how frequently data is likely to be accessed and/or assigned based on its perceived importance which may also may dictate that it should be stored in storage device that offers a relatively faster data access rate.

As noted above with respect to FIG. 1A, the storage management 102 can effectively manage the storage of data 106 in the multi-storage system 101 even though it may have storages A and B with widely different characteristics. Generally, storages 100A and 100B can differ from each other, for example, with respect to one or more differing characteristics and/or attributes that may be inherent and/or assigned. The differing characteristics can, for example, include volatility and/or persistency. As another example, a tier-level or a grade can be assigned to each one of the storages on a multi-tier or multi-grade storage configuration, etc. The attributes can reflect one or more characteristics associated with a storage 100 A or 100B (e.g., capacity, data access rate) but not necessarily, as a tier-level may, for example, be assigned based on various preferences even to storages that are otherwise exactly the same.

As a simple example, volatility and/or persistency are characteristics that can be easily distinguished and understood when considering a volatile and/or non-persistent memory device (e.g., a cache memory provided by a DIMM) in contrast to a non-volatile and/or persistent memory device (e.g., a HDD, SDD, Flash memory drive) as will readily be known to those skilled in the art.

As another simple example, multi-tier or multi-grade storage configurations can be provided that effectively rank or order storages in accordance with one or more of their respective characteristics or attributes in multiple tier levels. For example, the characteristics or attributes used in a multi-tier system can represent storage capacity and/or data access rates can be considered as characteristics or attributes to configure a multi-tier system today, where typically storage devices with relatively larger storage capacities can be relatively slower to access, whereas the storage devices that can offer relatively faster data access rates can have relatively smaller capacities. As noted above with respect to FIG. 1A, the storage management system 102 can effectively manage the storage of data in one of the multiple storages (e.g., storage 100A) of the multi-storage system 100, based on a temperature value of the data obtained for another one of the multiple storages (e.g., storage 100B) where the temperature of the data can, for example, be indicative of one or more storage management policies with respect to storing data (or storage of the data) in the storages 100A and 100B of the multi-storage system 100. The management policies can, for example, be based on one or more differing characteristics of the storages 100A and 100B.

By way of example, a specific temperature T1 can be assigned to a specific data or data portion. The temperature T1 can, for example, reflect a temperature determined and/or measured for the storage A. As such, temperature T1 can, for example, be determined based one or more factors (e.g., data access, importance) at, in and/or specifically for the storage A. As a very simple example, the temperature T1 can reflect the number of times that a data portion has been accessed for writing and/or reading.

In any case, the storage management system 102 can use the information associated with temperature T1 as storage information (112) to manage the storage of the data in storage 100B even though the temperature T1 is associated with a different storage, namely storage 100A that can have significantly different characteristics than storage 100B—where the temperature T1 can be effectively applied. In other words, the storage management system 102 can effectively manage the storage of data for the storage 100A based on a data temperature associated with the storage 100B and/or vice versa.

It will be appreciated that the storage management system 102 can effectively apply data temperatures associated with one storage environment to another storage environment where it may not be possible and/or feasible to obtain the same type of data temperature measurements or even not possible and/or feasible to obtain virtually any data temperature measurements at all.

By way of example, the storage 100A can be a non-volatile storage device system with multiple storage devices organized in tier-levels, whereas the storage 100B can be a volatile storage (e.g., cache memory, memory provided for in-line processing in an in-line processing system). As such, conventionally, it may not be possible and/or feasible to apply persistent data temperatures for the storage 100B given its volatile or non-persistent nature and/or environment. However, the storage management system 102 can effectively manage the storage of the data 106 for or in the volatile environment of the storage 100B using a data temperature T1 associated with the non-volatile environment of the storage 100A. As a result, storage of the data can be managed in a more efficient way for the storage 100B despite the fact that data temperatures cannot be persistently stored in the storage 100B.

It will also be appreciated that reverse is also true. More generally, information associated with a volatile storage environment can effectively be used by the storage management system 102 to more efficiently manage the storage of data in a non-volatile environment.

Generally, the storage management system 102 can use storage associated with one of the storages 100A and 100B (storage information 108) to better manage storage or data in the other storage. As noted above, the storage information 108 can, for example, include data access information (or access information) 114. In particular, data access information 114 associated with a volatile or non-persistent storage can be stored as persistent data and considered in managing a non-volatile or persistent storage, as well as in managing the multi-storage system 101 as a whole.

Referring again to FIG. 1A, the storage management system 102 can, for example, obtain and effectively use data access information 114 as the storage information 106 associated with a non-persistent storage (e.g., storage B) in the multi-storage system 101. Moreover, the storage management system 102 can store the data access information 114 and effectively use it for data storage management activities in accordance with another embodiment.

By way of example, the storage 100B can be a non-persistent storage (e.g., memory provided as cache and/or in an in-line memory processing system). In the example, data access information 114 can be associated with data access in a non-volatile storage (e.g., logical hits of data stored in memory provided as cache and/or in an in-line memory processing system). As such, the data access information 112 can be obtained as data access information of a volatile storage environment by the storage and stored as persistent data, for example, as metadata. Moreover, the access information 112 can be used by the storage management system 102 to better manage the multi-storage system 100. For example, data access information indicative of a number of logical hits in a memory provided as cache and/or in an in-line memory processing system of storage 100B can be taken into account in determining persistent data temperatures maintained for the multi-storage system 101, thereby allowing for more accurate data temperatures that can take into account data access information of a volatile storage environment as well as data access information of a non-volatile storage environment.

As will be described below in greater detail, the storage management system 102 can also be provided in a manner that would allow conventional storage management techniques (e.g., a convention LRU caching technique) to be used in combination or connection with techniques noted above, including the techniques that allow effective use of persistent temperatures associated with a non-volatile storage in a volatile storage environment. For example, a volatile cache memory can be provided that effectively uses both a conventional LRU caching and a scheme based on persistent data temperatures measured in a non-volatile storage in order to manage the cache memory (e.g., move data in or out of the cache memory).

Figure 1B:
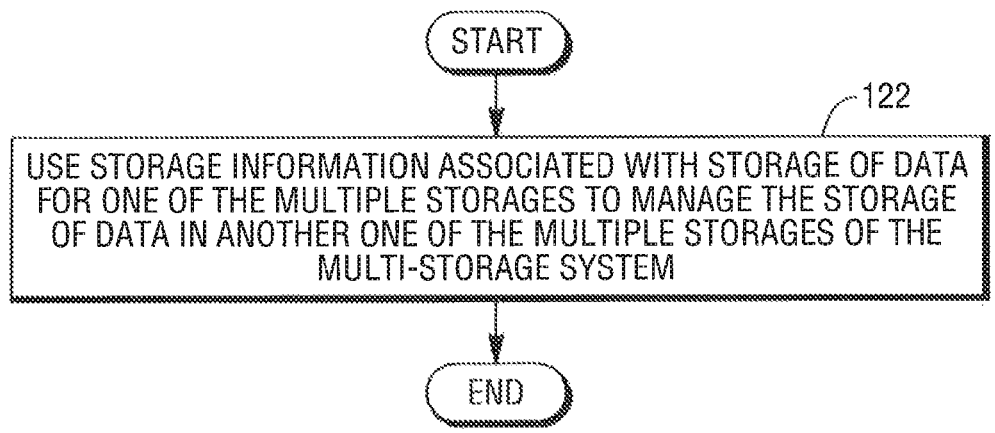
FIG. 1B depicts a method for managing data in a multi-storage system in accordance with one embodiment.

To elaborate further, FIG. 1B depicts a method 120 for managing data in a multi-storage system in accordance with one embodiment. It should be noted that that the multi-storage system can include multiple storages for storage of the data. The storages can differ from each other with respect to one or more characteristics, including, for example, volatility or persistence. The method 120 can, for example, be used by the storage management system 102 (shown in FIG. 1A). Referring to FIG. 1B, storage information associated with storage of data for one of the multiple storages is used (122) to manage the storage of data in another one of the multiple storages of the multi-storage system. The storage information associated with storage of data can, for example, include data access information, persistent data temperatures, data access information indicative of the number of times data stored in a volatile storage has been accessed, and so on. For example, using (122) of the storage information associated with storage of data for one of the multiple storages to manage the storage of data in another one of the multiple storages of the multi-storage system can include using data access information indicative of access of data in a volatile storage to determine a persistent data temperature for the data. This can, for example, include using a combination of logical I/O hits of a volatile storage and physical I/O hits of a non-volatile storage to determine persistent temperature of data that can be stored in multiple storages of a multi-storage system that includes at least one volatile storage and at least one non-volatile storage. It should be noted that in some memory systems I/O commands can be issued to effectively read from and write to volatile memory which may also be classified as "physical I/O hits). Generally, data access information associated with a volatile and non-volatile storages can be considered and used.

Figure 1C:
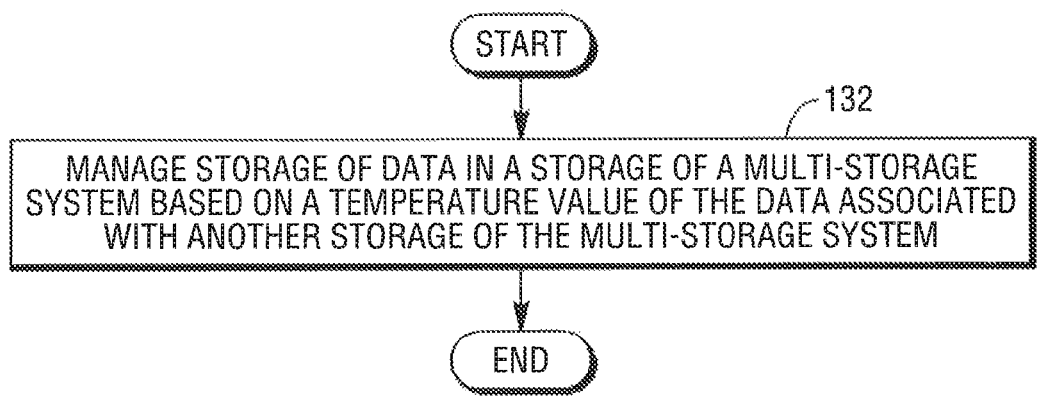
FIG. 1C depicts a method for managing data in a multi-storage system in accordance with another embodiment.

To elaborate even further, FIG. 1C depicts a method 130 for managing data in a multi-storage system in accordance with another embodiment. Again, it should be noted that that the multi-storage system can include multiple storages for storage of the data. The storages can differ from each other with respect to one or more characteristics, including, for example, volatility or persistence. The method 120 can, for example, be used by the storage management system 102 (shown in FIG. 1A). Referring to FIG. 1C, storage of data in a storage of a multi-storage system is managed (132) based on a temperature value of the data associated with another storage of the multi-storage system.

Figure 1D:
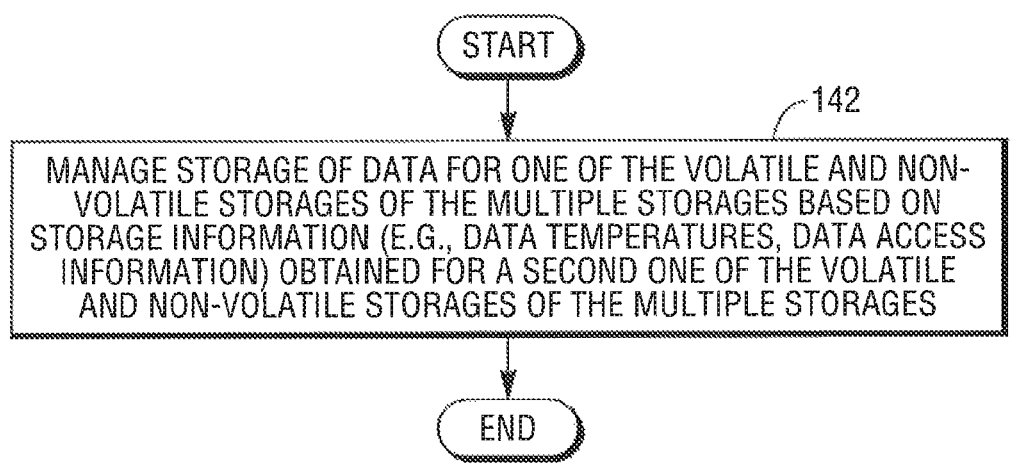
FIG. 1D depicts a method for managing data in a multi-storage system in accordance with yet another embodiment.

To elaborate further yet, FIG. 1D depicts a method 140 for managing data in a multi-storage system in accordance with yet another embodiment. It should be noted that the multi-storage system includes at least one non-volatile storage and at least one volatile storage. The method 120 can, for example, be used by the storage management system 102 (shown in FIG. 1A). Referring to FIG. 1D, storage of data for one of the volatile and non-volatile storages of the multiple storages is managed (142) based on storage information (e.g., data temperature, data access information) obtained (e.g., as determined or measured) for a second one of the volatile and non-volatile storages of the multiple storages. By way of example, the storage of data for the volatile storage can be managed (142) based on the temperature of the data obtained for the at least one non-volatile storage. In the example, the temperature of the data can be a persistent temperature assigned to the data as determined and/or measured for storage of the data in at least one non-volatile storage of a multi-storage system. Managing (142) of the storage can, for example, include: identifying and/or periodically identifying and/or dynamically identifying, based on the persistent temperature of the data, data to be stored in the at least one non-volatile storage. Also, the managing (142) of the storage of data for the at least one volatile storage based on the temperature of the data obtained for at least one non-volatile storage can, for example, further comprises one or more of the following: determining, based on a persistent temperature, whether to store the data in the at least one volatile storage, and determining, based on the persistent temperature, whether to remove and/or move the data from a volatile storage. It should also be noted that the at least one volatile storage can, for example, include at least one cache memory provided as a caching mechanism for storing data. Also, the storage of data can be managed (142) for a volatile storage based on the temperature of the data as determined and/or measured for a non-volatile storage, for example, as persistent temperatures measured over a period of time. As another example, managing (142) of the storage can, for example, include: using data access information of a volatile storage (e.g., logical hits in a cache memory) in determining persistent data temperatures.

Figure 2A:
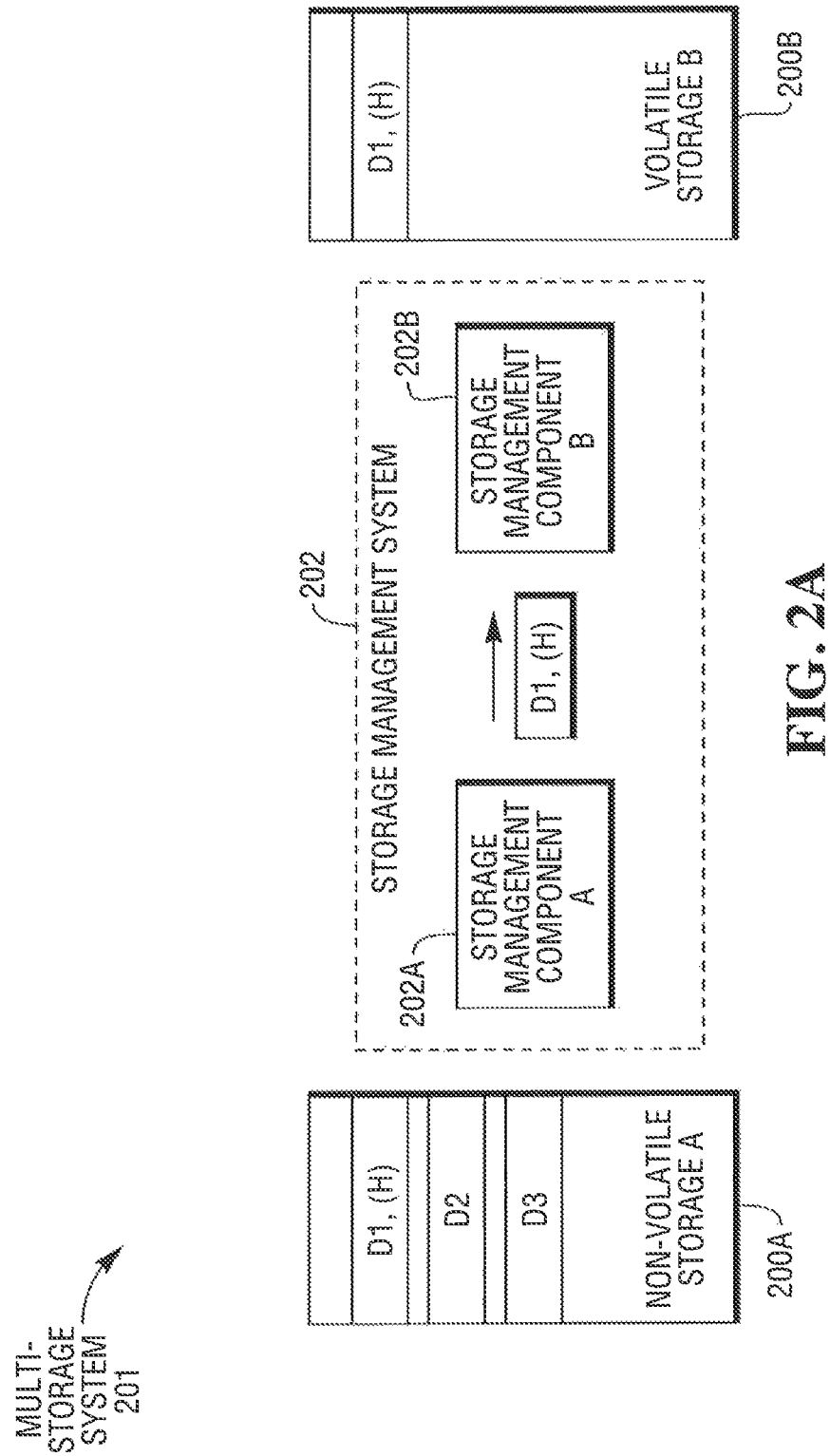
FIG. 2A depicts a storage management system provided for a multi-storage system that includes a non-volatile storage and a volatile storage 200B in accordance with another embodiment.

To further elaborate, FIG. 2A depicts a storage management system 202 provided for a multi-storage system 201 that includes a non-volatile storage 200A and a volatile storage 200B in accordance with another embodiment. Referring to FIG. 2A, the storage management system 202 is provided with components 202A and 202B that respectively manage the non-volatile storage 200A and volatile storage 200B. In the multi-storage system 201, the storage management component 202A can obtain persistent data temperatures that are maintained for the non-volatile storage 200A. For example, a data portion D1 can be marked as "hot" (H) data for, in and/or at the non-volatile storage 200A. This information (D1, (H)) can be effectively obtained and communicated by the storage management component 202A to the storage management component 202B that is configured to receive the information and effectively use it to manage the storage of data for the volatile storage B. Consequently, the storage management component 200B may store and keep the data portion D1 and optionally its assigned temperature value, in the volatile storage 200B with the realization that the data portion D1 is considered to be "hot" data in the persistent storage environment of the non-volatile storage A. This means that the data portion D1 can be realized as "Hot" Data, for example, at startup time or when otherwise it may not be recognized as "Hot" data and possibly ignored or even deleted from in volatile storage environment of the volatile storage B. Typically, the volatile storage B that can be faster memory used for caching and/or in-line memory processing of the data as those skilled in the art will readily know. It will also be appreciated that the storage management component 202A can continue to obtain persistent data temperatures that are maintained for the non-volatile storage 200A and effectively provided them to the storage management component 202B as updates that can, for example, be provided, periodically after a determined period of time and/or a number of access operations have been made, when a significant change in data temperatures or an event occurs. Consequently, the storage management component 202B can effectively manage the storage of data in the volatile storage B in a dynamic manner based on current and accurate data temperatures as can be measured in the persistent storage environment of the non-volatile storage A.

To further elaborate, FIG. 2B depicts communication of persistent data temperatures to a volatile memory 224 provided, for example, as cache memory in accordance with one embodiment. Referring to FIG. 2B, data temperatures are provided as integers for various data portions (or segments) in a non-volatile storage 220 that can also store the data, where a data portion D1 is assigned a data temperature integer value "90," a data portion D2 is assigned a data temperature integer value "80," and so on. The data portions can, for example, represent a determined unit of storage (e.g., a block, a cylinder).

In the example, at startup time when a system that includes the volatile storage 224 is initiated, a storage management component A (254A) can communicate the persistent data temperature information of the non-volatile storage 220 to a storage management component B (254B) that manages the storage of data in the volatile storage 224. This information can, for example, be provided as an ordered list ordered by temperature values: (D4, T100), (D1, T90) and so on. The storage management component B (254B) can, in turn, determine to store one or more the data portions identified, for example, by a "Hot" list, as "Hot" data (D4, D1, . . . ) in the volatile storage 224 at the startup time. This determination can, for example, be made based on the size and/or available size of the volatile storage B and/or a size of a configured portion dedicated to store data based on a temperature-based scheme. As an example, initially, only data portions D4 and D1 can be stored in the volatile storage 224 given a limited size that may have been configured in the volatile storage 224 for a temperature-based caching scheme. After the startup and as the system operates, the storage management component A (254A) can effectively update the persistent temperature information provided to the storage management component B (254B) in a dynamic manner. By way of example, when a new data portion D6 is assigned a data temperature that exceeds a threshold, the storage management A can provide the storage management component B (254B) with a new and/or updated ordered list: (D6, T101), and (D4,T100). As a result, the storage management component B (254B) can, for example, replace the data portion D1 with D6 given that the data portion D1 would have the lowest data temperature (T90) so as much "hottest" data as possible can be maintained in the volatile storage 224. Generally, updates of persistent data temperatures can be provided to the storage management component (224) B in a dynamic manner based on one or more criteria, for example, periodically, when an event occurs, or based on a predetermined or dynamic threshold. As a result, the storage management component B (254B) can effectively manage the volatile storage 224 based on persistent temperatures that can by dynamically updated.

Figure 2C:
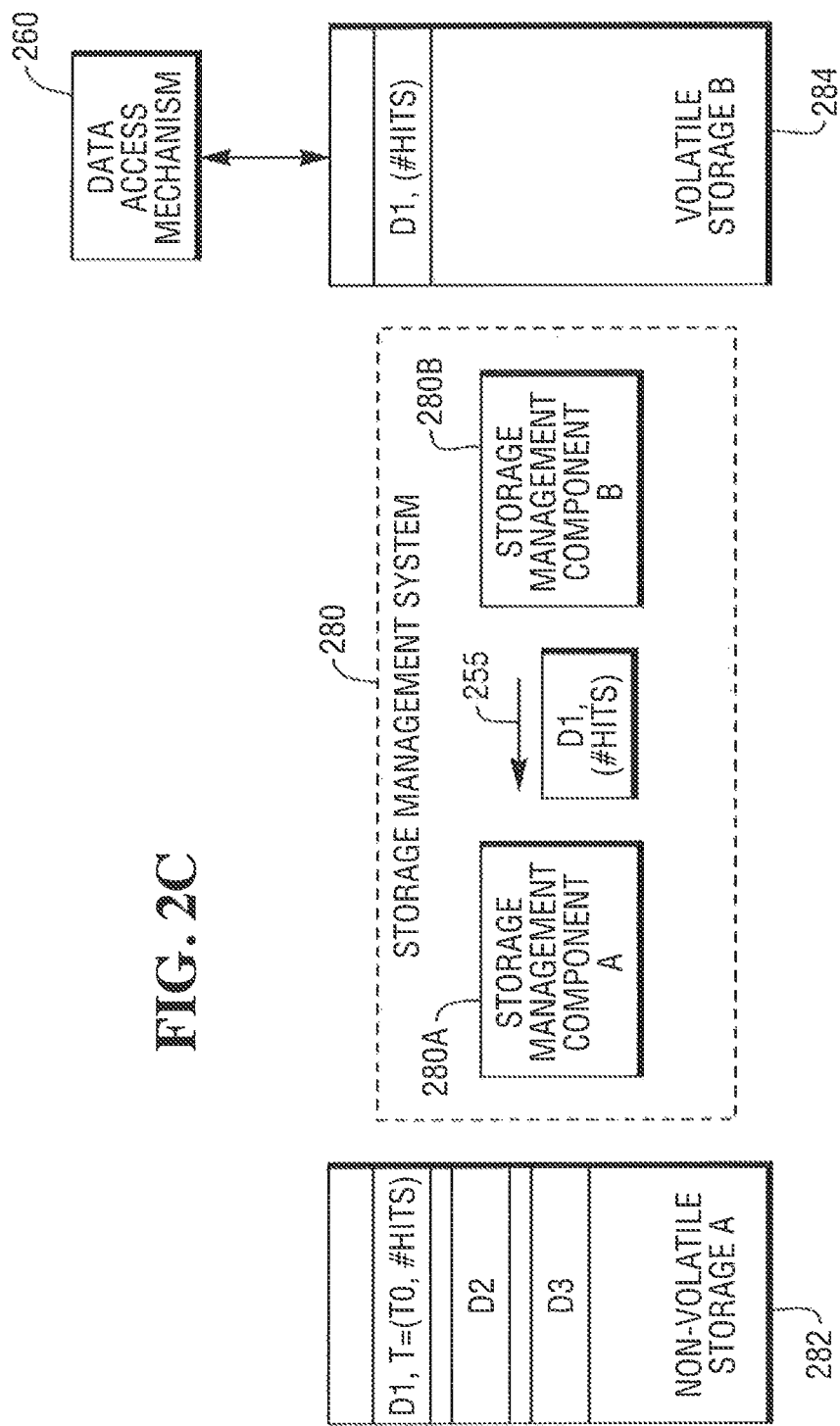
FIG. 2C depicts communication of data access information associated with a volatile storage B to a non-volatile storage (e.g., volatile cache memory) in accordance with one embodiment.

It should be noted that storage management system 202 can be configured, for example, to initially look for data in the volatile storage B (254) and then look into the non-volatile storage A (254) if needed (i.e., when data is not present in the volatile storage B (254). This can provide a mechanism to update the data (outside of startup time) in volatile storage B (254) when there is a change (e.g., there is change in a "hot list). This mechanism can also provide a temperature-based volatile storage (e.g., a cache) as opposed to just providing a tier of storage that can have unique data that is not in persistent storage. For example, when data D6 (not shown) is added with a temperature value of 101 that is not considered to be hot enough to be on a HOT list initially when it may be communicated at the system startup. As a result data D6 may not initially be placed in volatile storage B (254). However, when subsequently D6 is obtained from the non-volatile storage A (252), it may be placed into volatile storage B (254) with the recognition that it is now on the hotlist. In other words, data can be placed in the volatile storage B based on its temperature in a dynamic manner. To elaborate further, FIG. 2C depicts communication of data access information associated with a volatile storage B (254) to a non-volatile storage A 252 (e.g., volatile cache memory) by a storage management system 255 in accordance with one embodiment. Referring to FIG. 2C, data access information 255 associated with the volatile storage B (284) can be provided, for example, as a number of logical hits of a data portion D1 stored in the volatile storage B (284). For example, the volatile storage B (284) can be cache memory and/or in-line memory in a system that also uses the non-volatile storage A (282) for storage of the data. In the example, the number of logical hits (#hits) of a data portion D1 can be indicative of data is a very "hot" and accessed directly from the volatile storage B (254) as a data access mechanism (e.g., a database, a DBMS) 260 can generally be configured to effectively try to access data from the volatile storage B (284) before it tries to access it from the non-volatile storage A (282).

Conventionally, the data access information associated with the volatile storage B (284) would not get communicated to the non-volatile storage A (282) or taken into account as an indicator of data temperature. In fact, from the perspective of the non-volatile storage A (282), data that is continually accessed and maintained in the volatile storage B (284) (very "hot" data) may appear to be "colder" than it ought to be given that as long as the data portion is maintained in the volatile storage B (284), it would not be accessed from the non-volatile storage A (282). As such, conventionally, a data portion D1 that is maintained in the volatile storage B (284) can eventually even be considered to be cold data despite the fact that is very "hot" data being continually accessed and thus maintained in the volatile storage B (284).

However, it will be appreciated that the data access information 255 of the volatile storage B (282) can be communicated by the storage management component B (280A) to the storage management component A (284A) provided for the non-volatile storage A (284A). By way of example, numbers of times a data portion D1 is accessed in the volatile storage B can be maintained and communicated as a number of hits to the storage management component A. In turn, the storage management component A can effectively adjust the persistent temperature maintained for a data portion D1 based on its number of hits (255) obtained from the volatile storage B (284) so that a much more accurate measure of data temperatures can be obtained, for example, by considering both access from the non-volatile storage A (282) and volatile storage B (284). Of course, as noted above, the persistent temperatures can also be communicated back to the storage management component B (280B) provided for the volatile storage B.

It should also be noted that data access information 255 of the volatile storage B (284) can be communicated, by the storage management component B (280B) to the storage management component A (280A) provided for the non-volatile storage A, in a dynamic manner based on one or more criteria. For example, the data access information 255 (e.g., number of logical hits) can be provided periodically, or when a threshold is met (e.g., a determined number of logical accesses has been made), or when an event occurs (e.g., a data portion is about to be removed from the volatile storage B (284), system is about to shutdown). Generally, data access information 255 of the volatile storage B (284) can be communicated to and stored in the non-volatile storage A (282) before it is lost in consideration of the volatile nature of the volatile storage B (284). As such, before a data portion D1 is removed from the volatile storage B (284), its data access information 255 can be communicated by the storage management component B (280B) to the storage management component A (280A) so that the data access information 255 can be stored as persistent or non-volatile data and can be used accordingly.

It will be appreciated that communication of the data access information 255 of the volatile storage B (284) to the storage management component A (280A) provided for the non-volatile storage A (282) can be advantages and overcome a number of problems that can be encountered in conventional systems. One such problem is the adverse effects on temperature-based operations (e.g., temp-based compression of data where colder data is compressed) caused by the lack of consideration of access information in non-volatile storage environments where, for example, data maintained by and accessed in cache memory may be compressed as "cold" data despite the fact that can be very "hot" data. Another problem that can be addressed is improper or not optimal storage of data in cache memory at startup time, where "Hot" data maintained and accessed in the cache may be disregarded and replaced by data that is relatively not as "Hot" since the data access activities in non-volatile storage environments are not stored in a persistent manner. Yet another problem that can addressed is the improper placements of data in a data temperature-based scheme, where, for example, data that has been accessed and maintained in cache memory may not be considered as "Hot" data in a non-volatile storage and moved to a lower storage tier-level (e.g., moved from memory to SDD or HD, moved from SDD to HDD, moved from a faster HDD to a slower SDD).

As noted above, a storage management system (e.g., storage management system 102 of FIG. 1A) can be provided in a manner that would allow conventional storage management techniques (e.g., a convention LRU caching technique) to be used in combination or connection with techniques noted above, including techniques that allow effective use of persistent temperatures associated with a non-volatile storage in a volatile storage environment. For example, volatile cache memory can be provided that effectively uses both conventional LRU caching and persistent data temperatures.

Figure 3:
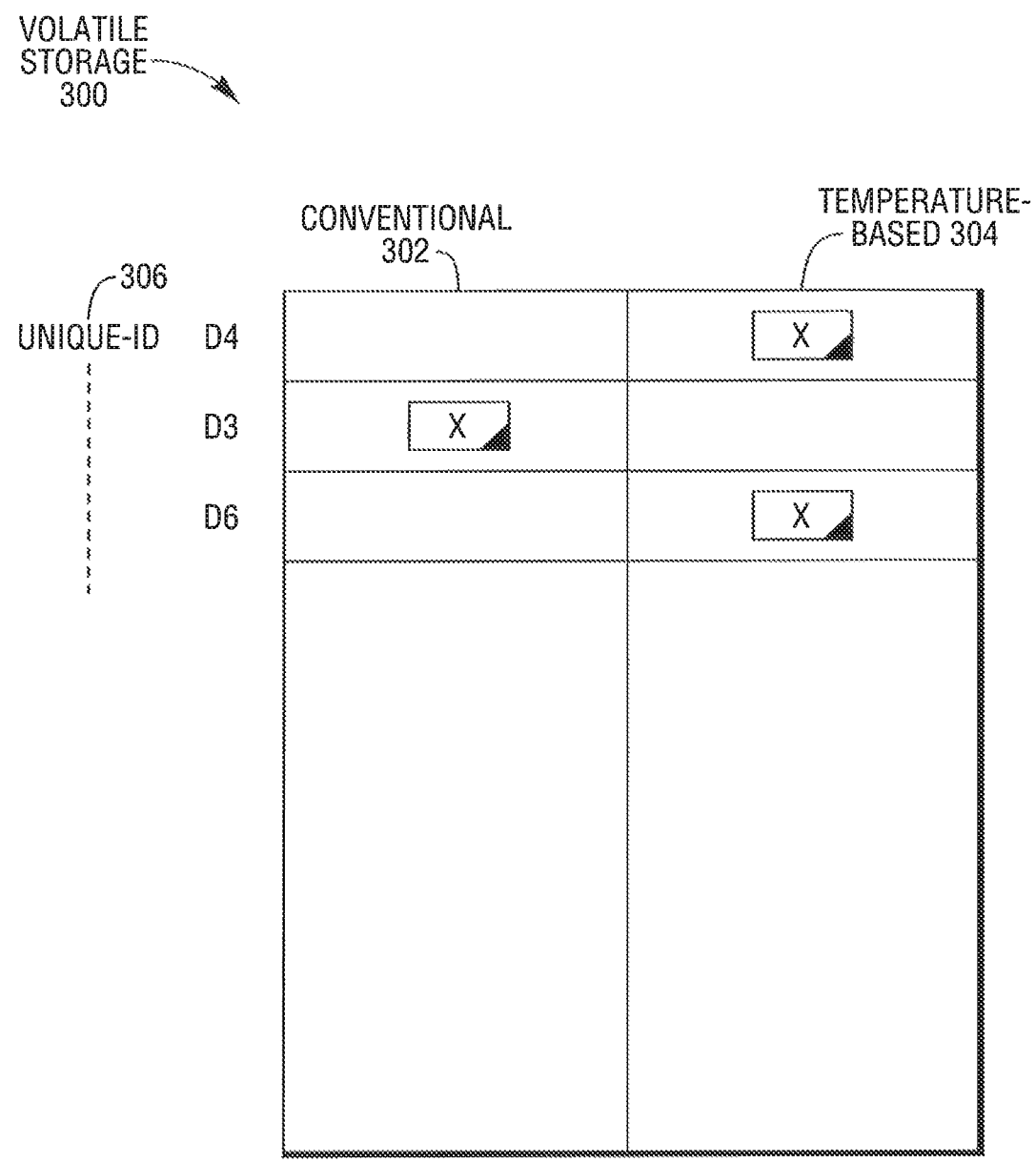
FIG. 3 depicts a volatile storage that uses a persistent temperature-based storage management technique as well as a conventional storage management technique in accordance with one embodiment.

To elaborate even further, FIG. 3 depicts a volatile storage 300 that uses a persistent temperature-based storage management technique as well as a conventional storage management technique in accordance with one embodiment. Referring to FIG. 3, two distinct portions can be provided in the volatile storage 300. A first portion 302 can be used to effectively implement a conventional storage management technique (e.g., a conventional LRU technique) while a second portion 304 can be used to effectively implement a non-conventional management technique, namely a temperature-based technique where data with higher persistent temperature can be continually maintained in the second portion 304 of the volatile storage 300 despite the fact that it may have been disregarded by the conventional storage management technique provided in the first portion 302.

It will also be appreciated that only one copy of data needs to be stored in the volatile storage 300. More specifically, data portions can be identified and accessed, for example, by a unique identifier 306, where the data need only be stored in one the first or second portions (302 and 304) and effectively marked as such so that it can be accessed from the appropriate portion. For example, a data portion D4 can be identified by its unique identifier 306 (e.g., assigned storage unit, cylinder identifier, section identifier) and located in the second portion 304 of the volatile storage 300. The embodiment depicted in FIG. 3, exemplifies a scheme where both conventional and temperature-based storage management techniques can be consolidated together but effectively work independently to maintain and update data in their own respective assigned portions. In the example, a data portion need not be kept in both portions in order to avoid unnecessarily complications that can arise by having two copies of the same data in the volatile storage 300. Thus, a storage management component and/or system can be configured to ensure that only a single copy of a data portion is maintained either in first portion 302 in accordance with a conventional storage management technique or in the second portion 304 in accordance with a data-temperature-based technique that considers persistent data temperatures in determining whether to keep or discard data in its designated portion 304 in favor of storing other data.

Those skilled in the art will readily appreciate that various conventional caching techniques can effectively be provided using the first portion 302 (shown in FIG. 3), including, for example, various versions of LRU techniques, aging techniques, as well as, Not Frequently Used (NFU), Least Frequently Used (LFU), Random Replacement, 2-Way Set Associative, Direct-mapped cache, Adaptive Replacement Cache, Clock with Adaptive Replacement, Multi Queue Caching Algorithm, Low Inter-reference Recency Set, etc. It should be noted that three (3) or more techniques caching techniques can be utilized, for example, by providing three or more portions that would each support a caching and/or aging algorithms. For example, a temp-based, a LRU and a LFU caching and/or aging techniques can be provided together.

Also, generally, data temperatures can be measured, specifically determined at, in, or for a specific storage device and/or environment based on one or more criteria (e.g., frequency of access, assigned importance, assigned allocation), assigned, assigned by user input and/or determined based on user input, etc.

It will be appreciated that the techniques described above are well suited for database systems (or databases), especially for large database systems that can typically store a relatively large amount of data. Such databases can, for example, include large parallel or multiprocessing database systems that may be comprised of multiple database nodes (or nodes), where each node can have its own processor(s) and storage device(s).

Figure 4:
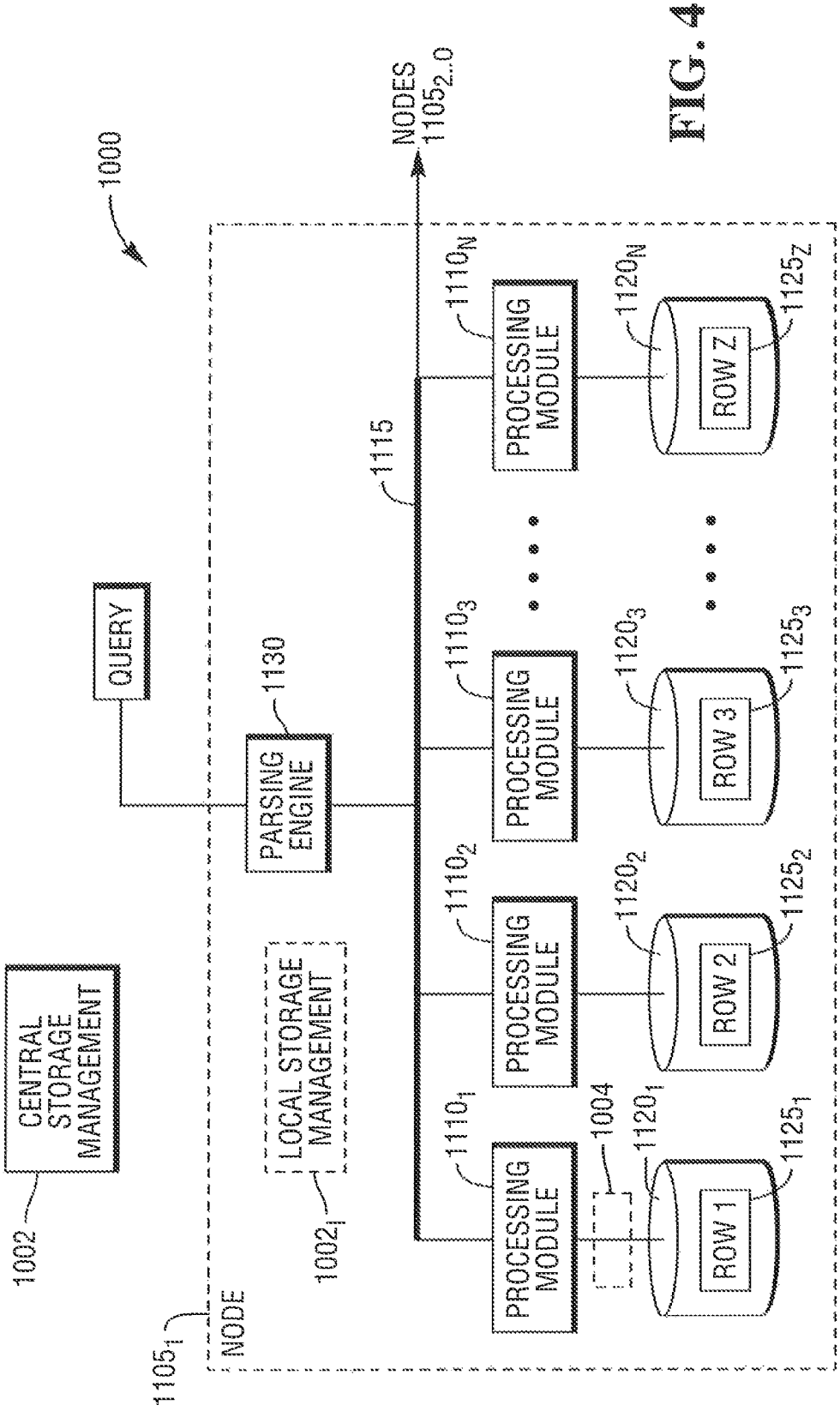
FIG. 4 depicts a database node of a database system or a Database Management System (DBMS) in accordance with one embodiment of the invention

To further elaborate, FIG. 4 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 4 depicts in greater detail an exemplary architecture for one database node $1105_1$ of the DBMS 1000 in accordance with one embodiment of the invention.

Referring to FIG. 4, the DBMS node $1105_1$ includes multiple processing units (or processing modules) $1110_{1-N}$ connected by a network 1115, that manage the storage and retrieval of data in data-storage facilities $1120_{1-N}$. Each of the processing units $1110_{1-N}$ can represent one or more physical processors or virtual processors, with one or more virtual processors (e.g., an Access Module Processer (AMP)) running on one or more physical processors in a Teradata Active Data Warehousing System). For example, when provided as AMPs, each AMP can receive work phases from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-Z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-Z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work phases that can be sent to be executed by the processing units $1110_{1-N}$.

For example, a client-side Host (e.g., a Personal Computer (PC), a server) can, be used to logon to the database system 1000 provided as a Teradata database server. Commination between the client-side Host and the database system 1000 can be facilitated by a database communicating mechanism, for example, by an ANSI CLI (Call Level Interface) standard that can include parcel requests and responses that facilitate the movement of data resident on the client-side host over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring to FIG. 4, those skilled in the art will readily appreciate that a central storage management system 1002 and/or one or more local storage management systems (e.g., $1002_1$) can be provided in accordance with one or more embodiments, including, for example, one or more embodiment described above with respect to storage management systems noted above. Taking one of the processing modules, namely processing module $1110_1$, as an example, a volatile cache memory 1004 can be provided as well as non-volatile data-storage facilities $1125_1$ where a local storage management system (e.g., $1002_1$) can effectively manage the storage of data in the volatile cache 1004 and the non-volatile storage of the data-storage facilities $1125_1$, for example, in accordance with one or more embodiments described above. Also, the cache memory 1004 can be provided to effectively manage data in accordance with a temperature-based technique as well as a conventional caching technique. In the example, logical cache hits of the cache memory 1004 can also be taken account in determining data temperatures that are in turn used to manage the cache memory 1004 efficiently, and so on.

Figure 5:
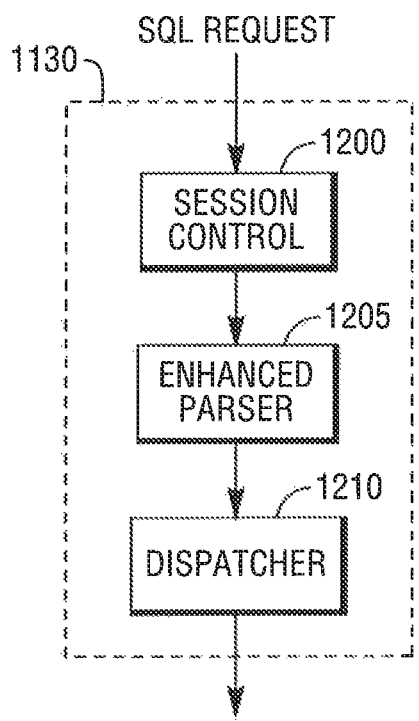
FIG. 5 depicts a parsing engine that can be made up of three components: a session control, a parser, and a dispatcher in accordance with one embodiment.

Referring now to FIG. 5, in one exemplary system, the parsing engine 1130 can be made up of three components: a session control 1200, a parser 1205, and a dispatcher 1210. In the example, the session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for data management and/or workload management may be performed by a regulator to monitor workloads and usage of the resources, for example, by using internal messages sent from the AMPs to the dispatcher 1210. The dispatcher 1210 can provide an internal status of every session and request running on the system, for example, by using internal messages sent from the AMPs to the dispatcher 1210. In the example, the dispatcher 1210 can provide an internal status of every session and request running on the system. As such, at least part of a database management can be provided by the dispatcher 1210 in accordance with one embodiment of the invention. The dispatcher 1210 can also operate as a workload dispatcher in order to effectively manage workloads. As such, at least part of data management system can be provided by the dispatcher 1210 in accordance with one embodiment of the invention.

Figure 6:
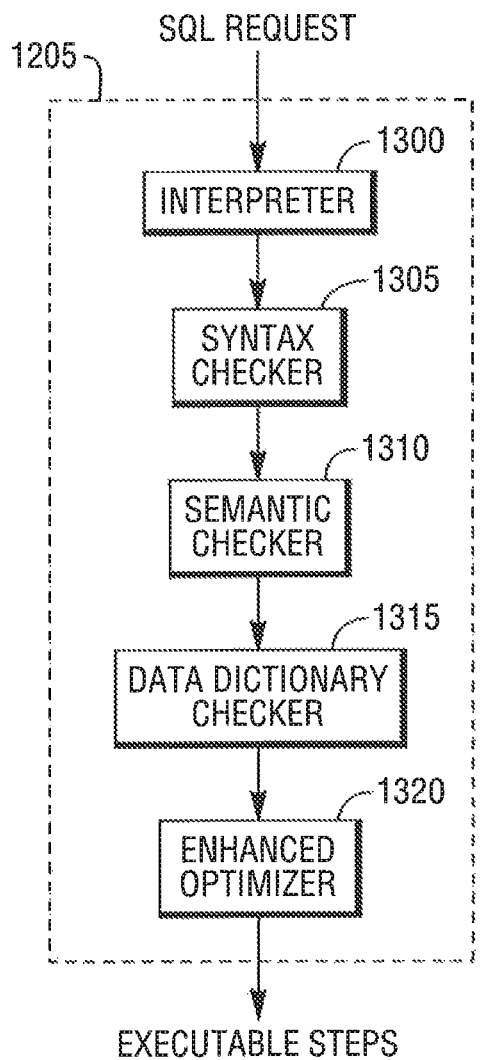
FIG. 6 depicts a parser that interprets a SQL request in accordance with one embodiment.
Figure 7:
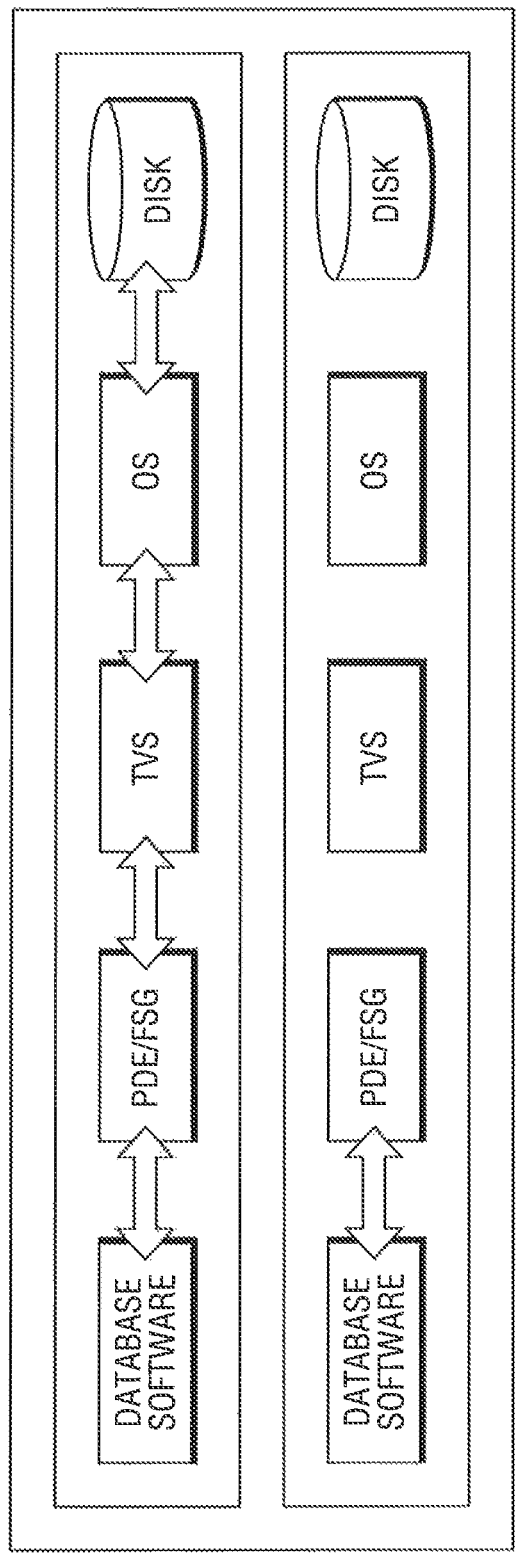
FIG. 7 illustrates the difference in the data transfer path when a database requests a data block that needs to be retrieved from a physical disk (above) and when the data block already resides in memory and in FSG cache (below) in accordance with one embodiment.

As illustrated in FIG. 6, the parser 1205 interprets the SQL request 1300, checks it for proper SQL syntax 1305, evaluates it semantically 1310, and consults a data dictionary to ensure that all of the objects specified in the SQL request actually exist and that the user has the authority to perform the request 1305. Finally, the parser 1205 runs an optimizer 1320, which can generate the least expensive plan to perform the request. As an example, Teradata database systems have made use of File Segment (FSG) cache to speed up input/output (I/O) operations by caching data blocks, for example, in a Least Recently Used (LRU) fashion, reducing the amount of physical I/O required for both perm and spool tables. Parallel Database Extensions (PDE), which can handle low-level functionality for the Teradata Database, controls FSG cache. The LRU algorithm is a commonly used caching technique where access to the data in cache is tracked, and the data in cache that has been used the least recently will be aged out in order to provide space for new data, when required. While the amount of memory used for FSG cache is tunable, older 32-bit Windows and MP-RAS (UNIX) operating system. Although in the past systems could have been limited to 4 GB of physical memory per node, larger physical memory sizes can now be installed, for example, on 64-bit Windows and Linux platforms, with the ability to use a majority of it for FSG cache. As an example, Teradata database systems can made use of File Segment (FSG) cache to speed up input/output (I/O) operations by caching data blocks, for example, in a Least Recently Used (LRU) fashion, reducing the amount of physical I/O required for both perm and spool tables. Parallel Database Extensions (PDE), which can handle low-level functionality for the Teradata Database, controls FSG cache. The LRU algorithm is a commonly used caching technique where access to the data in cache is tracked, and the data in cache that has been used the least recently will be aged out in order to provide space for new data, when required. While the amount of memory used for FSG cache is tunable, older 32-bit Windows and MP-RAS (UNIX) operating systems were limited to 4 GB of physical memory per node. Larger physical memory sizes can now be installed on 64-bit Windows and Linux platforms, with the ability to use a majority of it for FSG cache. Teradata Virtual Storage (TVS) can be used to automatically migrate frequently accessed data to solid state disks on mixed storage systems (faster solid state drives co-existing with slower spinning hard disk drives), improving overall system performance by optimizing the I/O subsystem. This is done by tracking how often data gets accessed from disk, and assigning a temperature value to the data to differentiate between infrequently accessed data (COLD) and frequently accessed data (HOT). Since rows within tables and indexes might have varying access patterns, the temperature can be determined at the cylinder level, which can, for example, be a fixed size of roughly 12 MB (e.g., 11.4 MB). Of course, cylinder is used just as an example and various other units of data can be used as desired. FIG. 7 illustrates the difference in the data transfer path when a database requests a data block that needs to be retrieved from a physical disk (above) and when the data block already resides in memory and in FSG cache (below) in accordance with one embodiment.

A more intelligent database memory can be provided in accordance with one embodiment. The intelligent database memory can leverage existing PDE and TVS infrastructures, where data kept in a FSG cache can be controlled based on frequency of use, which similar to how persistent data can be migrated from HOT and COLD storage. However, instead of determining what is kept in FSG cache solely based on, for example, an LRU algorithm, cache can be controlled based on data temperatures. For example, the most frequently accessed data on the system that can fit into FSG cache is now marked as VERY HOT by the database, and this data is eligible to remain in memory when traditional ageing techniques would have otherwise aged the data out of the FSG cache.

In addition, all I/Os on a database system, from a physical disk or FSG cache will have an impact on data temperature. This can ensure a more accurate temperature of the data and helps avoid response time inconsistency issues in situations where data that is frequently accessed is determined to be COLD and placed on a slower storage.

For example, an option (e.g., an intelligent memory option) can be provided that when turned on the amount of FSG cache available for VERY HOT cache (VH cache) can be set in the control globally distributed object (GDO) via a Control GDO Editor (ctl). This can, for example, be similar to how memory can be allocated for a FSG cache today. The control GDO can, for example, include one or more system-wide settings and can be maintained by the PDE subsystem. TVS can generate and maintain a list of the hottest permanent (perm) data cylinders on the system. Cylinders can, for example, be a of a fixed size and include several variable sized data blocks and the actual amount of data in cylinder will vary due to file system fragmentation and the defined free space percentage for the table or index.

Figure 8:
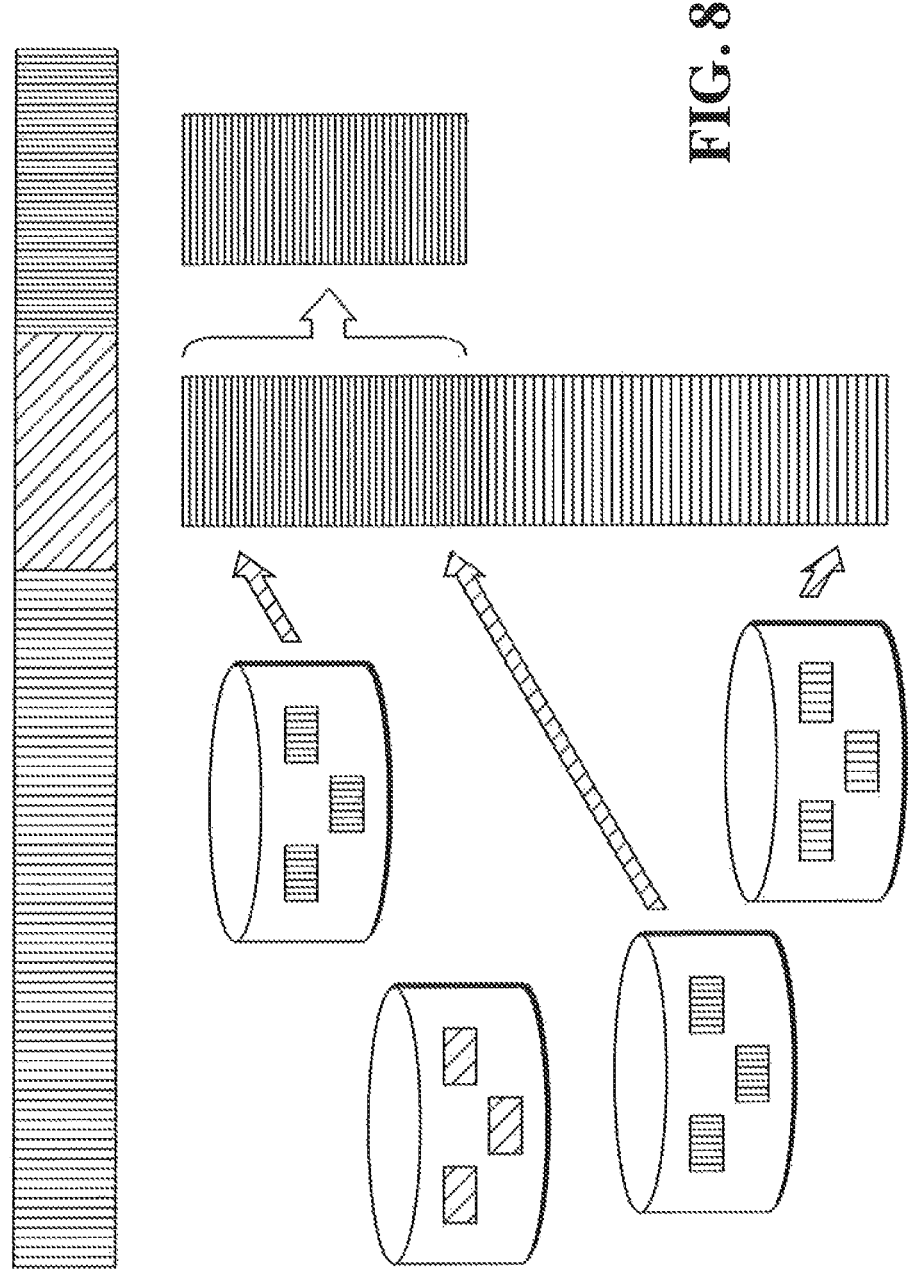
FIG. 8 depicts a Database File system that manages the data blocks and cylinders in accordance with one embodiment.

FIG. 8 depicts a Database File system that manages the data blocks and cylinders in accordance with one embodiment. Referring to FIG. 8, TVS can build the VERY HOT candidate list and can sort by temperature. PDE can keep as many of the hottest cylinders from the candidate list in the VERY HOT cache as possible.

PDE can first determine how much memory per AMP has been allocated for an Intelligent Memory implementation to use as VERY HOT cache and can communicate this with the Teradata Virtual Storage subsystem, which in turn can generate the list containing the hottest cylinders for that AMP, and send it back to PDE. The total number of cylinders listed in the list of VERY HOT (VH) cylinders can require more memory than the amount of memory that has been allocated for VERY HOT cache to account for empty space within cylinders. As such, this list can list the cylinders that are candidates for VH cache based on temperature—what is actually kept in VH cache can be a subset of data blocks from the cylinders on the VH cylinders list.

The list of VERY HOT candidates can be shared with a FSG cache, and when a permanent data block is accessed from disk, the FSG cache can place it in VERY HOT cache if the cylinder in which the data block resides is on the VERY HOT candidate list and is hotter than the coldest cylinder that is currently living in VERY HOT cache. This data block can remain in VERY HOT cache until it is replaced with a data block that is on the VERY HOT candidate list and has a higher relative temperature or if the data is deleted completely from the database by normal user activity. When the temperature of a cylinder has increased so that it is now included on the VERY HOT candidate list, the database will place data blocks from that cylinder into VERY HOT cache as they are accessed from disk. While the data in FSG cache is maintained across a normal database restart, in cases where FSG cache is aged out, for example, when the system is brought down for maintenance, the database file system spawns a process that will preload all of the data blocks on the VERY HOT cylinders into VH cache once the system is brought back up and reaches the logons enabled state.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of managing data in a multi-storage system that includes multiple storages for storage of the data, wherein the method is implemented at least partly by a device, and wherein the method comprises:
    using storage information associated with storage of data in a first one of the multiple storages to manage storage of data in another one of the multiple storages of the multi-storage system; and
    providing the storage information associated with storage of data in the first one of the multiple storage devices to the second one of the multiple storages, thereby allowing the second one of the multiple storage devices to manage storage of data in the second one of the multiple storage devices, based on the information associated with storage of data in the first one of the multiple storage devices.

2. The method of claim 1, wherein the storage information includes one or more of the following:
    data access information, persistent data temperatures, data access information indicative of access of data in a volatile storage, and data access information indicative of access of data in a non-volatile storage.

3. The method of claim 1, wherein the storage information includes data access information indicative of access of data in a volatile storage, and wherein the method further comprises: using the data access information indicative of access of data in a volatile storage to determine a persistent data temperature for the data.

4. The method of claim 1, wherein the using of the data access information comprises: using a combination of logical I/O hits of the volatile storage and physical PO hits of the nonvolatile storage to determine the persistent temperature of data to be stored in the multiple storages of the multi-storage system.

5. The method of claim 1,
    wherein the storage information associated with storage of data in the first one of the multiple storage devices includes data management information indicative of management of at least first and second data in accordance with a data management policy, and
    wherein the second one of the multiple storage devices uses the storage information to manage the storage of the first and second data in the second one of the multiple storage devices in accordance with the data management policy.

6. The method of claim 1, wherein the managing of data in the second one of the multiple storage devices does not include moving data between the first one of the multiple storage devices and the second one of the multiple storage devices.

7. A device that includes one or more processors configured to: manage data in a multi-storage system that includes multiple storages for storage of the data by at least using storage information associated with storage of data for one of the multiple storages to manage the storage of the data in another one of the multiple storages of the multi-storage system, and providing the storage information associated with storage of data in the first one of the multiple storage devices to the second one of the multiple storages, thereby allowing the second one of the multiple storage devices to manage storage of data in the second one of the multiple storage devices, based on the information associated with storage of data in the first one of the multiple storage devices.

8. The device of claim 7, wherein the storage information includes one or more of the following: data access information, persistent data temperatures, data access information indicative of access of data in a volatile storage, and data access information indicative of access of data in a non-volatile storage.

9. The device of claim 7, wherein the storage information includes data access information indicative of access of data in a volatile storage, and wherein the one or more processors are further configured to: use the data access information indicative of access of data in a volatile storage to determine a persistent data temperature for the data.

10. The device of claim 7, wherein the using of the data access information comprises: using a combination of logical I/O hits of the volatile storage and physical I/O hits of the nonvolatile storage to determine the persistent temperature of data to be stored in the multiple storages of the multi-storage system.

11. A non-transitory computer readable storage medium that stores at least executable computer code that when executed manages data in a multi-storage system that includes multiple storages for storage of the data by at least using storage information associated with storage of data for one of the multiple storages to manage the storage of the data in another one of the multiple storages of the multi-storage system, and providing the storage information associated with storage of data in the first one of the multiple storage devices to the second one of the multiple storages, thereby allowing the second one of the multiple storage devices to manage storage of data in the second one of the multiple storage devices, based on the information associated with storage of data in the first one of the multiple storage devices.

12. The non-transitory computer readable storage medium of claim 11, wherein the storage information includes one or more of the following: data access information, persistent data temperatures, and data access information indicative of access of data in a volatile storage data access information indicative of access of data in a non-volatile storage.

13. The non-transitory computer readable storage medium of claim 11, wherein the storage information includes data access information indicative of access of data in a volatile storage, and wherein the one or more processors are further configured to: use the data access information indicative of access of data in a volatile storage to determine a persistent data temperature for the data.

14. The non-transitory computer readable storage medium of claim 11, wherein the using of the data access information comprises: using a combination of logical I/O hits of the volatile storage and physical I/O hits of the non-volatile storage to determine the persistent temperature of data to be stored in the multiple storages of the multi-storage system.

15. The non-transitory computer readable storage medium of claim 11, wherein the multiple storages include a volatile storage and a non-volatile storage.

16. The non-transitory computer readable storage medium of claim 11, wherein the data access information includes at least one of: physical I/O hits and logical I/O hits.

17. A computer-implemented method of managing data in a multi-storage system that includes multiple storages for storage of the data, wherein the computer-implemented method is implemented at least partly by one or more processors executing computer code stored in a non-transitory computer readable storage medium, and wherein the computer-implemented method comprises:
  obtaining information associated with storage of data in a first one of the multiple storages;
  sending the information associated with storage of data in the first one of the multiple storages to a second one the multiple storages; and
  thereafter, using by the second one of the multiple storages, the sent information associated with the storage of data in the second one of the one of the multiple storages, to manage the storage of data in the second one of the one of the multiple storages.

18. A computer-implemented method of managing data in a multi-storage system that includes multiple storages for storage of the data, wherein the computer-implemented method is implemented at least partly by one or more processors executing computer code stored in a non-transitory computer readable storage medium, and wherein the computer-implemented method comprises:
  receiving, by a storage manager of a first one of the multiple storages, data usage information pertaining to use of data in a second one of the multiple storages; and
  using, by the storage manager of the first one of the multiple storages, the data usage information pertaining to use of the data in a second one of the multiple storages to manage the storage of data in the first one of the multiple storages.

19. A computer-implemented method of managing data in a multi-storage system that includes a volatile storage and a non-volatile storage for storage of the data, wherein the computer-implemented method is implemented at least partly by one or more processors executing computer code stored in a non-transitory computer readable storage medium, and wherein the computer-implemented method comprises:
  providing information associated with storage of data in the volatile storage to a storage manager of the non-volatile storage; and
  using by the storage manager of the non-volatile storage, the information associated with the storage of data in the volatile storage, to manage the storage of data in the non-volatile storage.

* * * * *